United States Patent
Chen

(10) Patent No.: US 10,313,866 B2
(45) Date of Patent: Jun. 4, 2019

(54) METHOD FOR ESTABLISHING AND MONITORING BLUETOOTH LOW ENERGY WIRELESS NETWORK

(71) Applicant: Linctronix Ltd., New Taipei (TW)

(72) Inventor: Kuei-Han Chen, New Taipei (TW)

(73) Assignee: LINCTRONIX LTD., New Taipei (TW)

( * ) Notice: Subject to any disclaimer, the term of this patent is extended or adjusted under 35 U.S.C. 154(b) by 158 days.

(21) Appl. No.: 15/611,240

(22) Filed: Jun. 1, 2017

(65) Prior Publication Data
US 2018/0020340 A1    Jan. 18, 2018

(30) Foreign Application Priority Data

Jul. 12, 2016   (TW) .............................. 105121948 A

(51) Int. Cl.
| | | |
|---|---|---|
| *H04W 8/00* | (2009.01) | |
| *H04W 76/10* | (2018.01) | |
| *H04W 8/24* | (2009.01) | |
| *H04W 4/02* | (2018.01) | |
| *H04W 76/18* | (2018.01) | |

(Continued)

(52) U.S. Cl.
CPC .............. *H04W 8/005* (2013.01); *H04W 4/02* (2013.01); *H04W 4/80* (2018.02); *H04W 8/24* (2013.01); *H04W 76/15* (2018.02); *H04W 76/18* (2018.02); *H04W 84/18* (2013.01); *Y02D 70/00* (2018.01); *Y02D 70/10* (2018.01); *Y02D 70/14* (2018.01); *Y02D 70/144* (2018.01); *Y02D 70/26* (2018.01)

(58) Field of Classification Search
CPC ..... H04W 8/005; H04W 76/15; H04W 76/18; H04W 4/02; H04W 8/24; H04W 4/80; H04W 76/10; H04W 84/18; Y02D 70/10; Y02D 70/144; Y02D 70/14; Y02D 70/00; Y02D 70/26; H04B 3/544; H04B 7/18558
See application file for complete search history.

(56) References Cited

U.S. PATENT DOCUMENTS

| 10,007,241 B1* | 6/2018 | Hedin ..................... G05B 15/02 |
| 2015/0080031 A1* | 3/2015 | Moldaysky ............. H04W 4/02 |
| | | 455/456.3 |

(Continued)

FOREIGN PATENT DOCUMENTS

| CN | 103561479 A | 2/2014 |
| CN | 104053155 A | 9/2014 |

(Continued)

*Primary Examiner* — Andrew Wendell

(57) ABSTRACT

A method for establishing and monitoring a Bluetooth low energy wireless network comprises the following steps. A first Bluetooth wireless device in the plurality of Bluetooth low energy wireless devices is controlled from a broadcast state into a detection state. In the detection state, the first Bluetooth wireless device receives a first connectable broadcast signal transmitted from a second Bluetooth wireless devices of the Bluetooth low energy wireless device. The first Bluetooth wireless device establishes a first Bluetooth connection with the second Bluetooth wireless device according to the first connection request. A trigger instruction is transmitted from the first Bluetooth wireless device to the second Bluetooth wireless device via the first Bluetooth connection, in order to control the second Bluetooth wireless device to enter into a detection state.

10 Claims, 8 Drawing Sheets

(51) Int. Cl.
*H04W 4/80* (2018.01)
*H04W 76/15* (2018.01)
*H04W 84/18* (2009.01)

(56) References Cited

U.S. PATENT DOCUMENTS

| | | | |
|---|---|---|---|
| 2015/0099469 A1* | 4/2015 | Goldstein | H04W 4/21 |
| | | | 455/41.2 |
| 2015/0182797 A1* | 7/2015 | Wernow | G06F 19/3418 |
| | | | 434/247 |
| 2015/0195857 A1* | 7/2015 | Pan | H04W 76/10 |
| | | | 455/41.3 |
| 2016/0309323 A1* | 10/2016 | Zarakas | H04W 12/06 |
| 2016/0343032 A1* | 11/2016 | DeWitt | G06Q 30/0261 |
| 2016/0371961 A1* | 12/2016 | Narang | H04W 8/005 |
| 2017/0301160 A1* | 10/2017 | Somani | H04W 4/80 |
| 2018/0098338 A1* | 4/2018 | Choi | H04L 29/08 |
| 2018/0368206 A1* | 12/2018 | Wohler | H04L 43/10 |
| 2018/0375388 A1* | 12/2018 | Byun | H02J 7/025 |

FOREIGN PATENT DOCUMENTS

| | | |
|---|---|---|
| CN | 104539323 A | 4/2015 |
| TW | 201212676 A | 3/2012 |

\* cited by examiner

METHOD FOR ESTABLISHING AND MONITORING BLUETOOTH LOW ENERGY WIRELESS NETWORK

BACKGROUND OF THE INVENTION

Field of the Invention

The present invention relates to a method for establishing and monitoring a Bluetooth low energy wireless network, for assisting a plurality of Bluetooth low energy wireless devices to establish a Bluetooth low energy wireless network.

Description of the Prior

The Bluetooth low energy wireless device is prevalent. It is usually used for point-to-point links to individual regional communications, such as the connection between a wearable device and a personal hand-held device, or the connection between an AV device and a wireless gateway at home. These devices cannot communicate and exchange data directly. These devices can communicate only with a star topology formed by a central gateway or a hub, such as a handheld device or a personal computer.

However, the link between devices in a network is limited by the Bluetooth low energy transmission distance, the low energy consumption of the Bluetooth low energy device, and the need for collocation of gateways and power lines to increase the size and coverage of the network, which results in difficult and inefficient expansion of the network. For example, there are a variety of environmental sensing devices (temperature/humidity meters, motion sensors, etc.) on the market that need to be deployed in different locations to cover the entire range to be monitored. These sensing devices cannot form a network to exchange measurement data. When people need to collect the data of these sensing devices, they need to move or build a gateway or a hub to each sensing device for collect all of the measured data In addition, the existing Bluetooth low energy wireless network connection is achieved via the connection-less communication of the Bluetooth low energy technology. The connection-less communication is achieved by the broadcaster and observer. A network formed in this manner cannot effectively exploit the power saving characteristics of the connection to establish the communication of the Bluetooth low energy, so that cannot meet the needs of small power, such as AA batteries, button batteries, for working for a long time.

In addition, the existing Bluetooth low energy signal devices related applications, such as iBeacon or EddyStone, a large and decentralized distribution results in inefficient provision from centralized management of each device. The current centralized management way can be done via the mobile device in batches to complete the device provision which is limited to the mobile device signal range. For example, devices in a whole building needs to be divided into every floor or every floor needs to be divided into each compartment for the signal device settings.

SUMMARY OF THE INVENTION

In order to solve the above technical problem, the present invention provides a method of establishing and monitoring a Bluetooth low energy wireless network for helping a plurality of Bluetooth low energy wireless devices to establish a plurality of Bluetooth low energy wireless networks.

The method of present invention for establishing and monitoring Bluetooth low energy wireless network, for helping a plurality of Bluetooth low energy wireless devices to establish a Bluetooth low energy wireless network, comprising the following steps of: controlling a first Bluetooth wireless device of the Bluetooth low energy wireless devices to enter a detection state from a broadcast state; wherein, in the detection state, the first Bluetooth wireless device receives a first connectable broadcast signal transmitted from a second Bluetooth wireless devices of the Bluetooth low energy wireless device, and the first connectable broadcast signal comprises a first device identification code corresponding to the second Bluetooth wireless device; wherein, in a connection establishing state, the first Bluetooth wireless device establishes a first Bluetooth connection with the second Bluetooth wireless device according to the first connectable broadcast signal and the first device identification code; and wherein, the first Bluetooth wireless device transmits a trigger instruction to the second Bluetooth wireless device via the first Bluetooth connection to control the second Bluetooth wireless device to enter the detection state.

The method of present invention for establishing and monitoring Bluetooth low energy wireless network, wherein after the step of establishing the first Bluetooth connection, the method further comprises the following steps of: wherein, when the first Bluetooth wireless device detects that the first Bluetooth connection is interrupted, the first Bluetooth wireless device generates a corresponding connection failure record; and wherein, the first Bluetooth wireless device determines whether to re-establish the first Bluetooth connection with the second Bluetooth wireless device according to the connection failure record.

The method of present invention for establishing and monitoring Bluetooth low energy wireless network, further comprising the following steps of: wherein, in the detection state, the first Bluetooth wireless device receives a third connectable broadcast signal transmitted from a fourth Bluetooth wireless devices of the Bluetooth low energy wireless device, and the third connectable broadcast signal comprising a third device identification code corresponding to the fourth Bluetooth wireless device; and wherein, the first Bluetooth wireless device establishes a third Bluetooth connection with the fourth Bluetooth wireless device according to the third connectable broadcast signal and the third device identification code.

The method of present invention for establishing and monitoring Bluetooth low energy wireless network, wherein the device identification code may comprises UUID, Major ID, and Minor ID as defined by iBeacon or EddyStone. Via the device identification code, the function of device recognition and iBeacon or EddyStone Bluetooth signal transmission function can be simultaneously achieved.

The method of present invention for establishing and monitoring Bluetooth low energy wireless network, further comprising the following steps of: wherein the first Bluetooth wireless device modifies the first device identification code of the second Bluetooth wireless device or modifies a third device identification code of a fourth Bluetooth wireless device.

The method of present invention for establishing and monitoring Bluetooth low energy wireless network, further comprising the following steps of: wherein the second Bluetooth wireless device modifies the second device identification code of the third Bluetooth wireless device.

The method of present invention for establishing and monitoring Bluetooth low energy wireless network, wherein the first connectable broadcast signal comprises a first geospatial information corresponding to the second Bluetooth connection device; the method further comprises the following steps of: the first Bluetooth connection device receives the first connectable broadcast signal transmitted by the second Bluetooth wireless device and generates a relative or absolute geospatial information of the second Bluetooth wireless device according to the first geospatial information. Wherein, the first geospatial information can be global geographic coordinate information or floor location coordinates of a building.

The method of present invention for establishing and monitoring Bluetooth low energy wireless network, further comprising the following steps of: the second Bluetooth wireless device providing the information collected by itself to the first Bluetooth wireless device via the first Bluetooth connection and the fourth Bluetooth wireless device providing the information collected by itself to the first Bluetooth wireless device via the third Bluetooth connection. This information comprises the information provided by the third Bluetooth wireless device.

The method of present invention for establishing and monitoring Bluetooth low energy wireless network, further comprising the following steps of: the first Bluetooth wireless device transmits the information to the second and fourth Bluetooth wireless devices via the first and third Bluetooth connections, respectively. The information can comprise the device control instructions or sensor data, system log file data, and the like.

The method of present invention for establishing and monitoring Bluetooth low energy wireless network, further comprising the following steps of: the second Bluetooth wireless device transmits the information to the third Bluetooth wireless devices via the second Bluetooth connection. The information can comprise the device control instructions or sensor data, system log file data, and the like.

In summary, the method of present invention for establishing and monitoring Bluetooth low energy wireless network, for helping a plurality of Bluetooth low energy wireless devices to establish the Bluetooth low energy wireless network. A plurality of Bluetooth low energy wireless devices in the Bluetooth low energy wireless network can exchange data with each other and can transmit data to any one of the Bluetooth low energy wireless devices in the Bluetooth low energy wireless network. In addition, a plurality of Bluetooth low energy wireless devices can be interconnected to form a network in a low energy Bluetooth wireless network system, and can detect the interruption of the Bluetooth low energy wireless device and re-establish the Bluetooth connection. A plurality of Bluetooth low energy wireless devices can also dynamically extend the Bluetooth wireless network as well as the collection, transmission and distribution of data.

BRIEF DESCRIPTION OF THE APPENDED DRAWINGS

In order to further clarify the objects, technical solutions, and advantages of the present invention, the present invention will be described in further detail with reference to the accompanying drawings and examples.

DETAILED DESCRIPTION OF THE INVENTION

Figure 1:
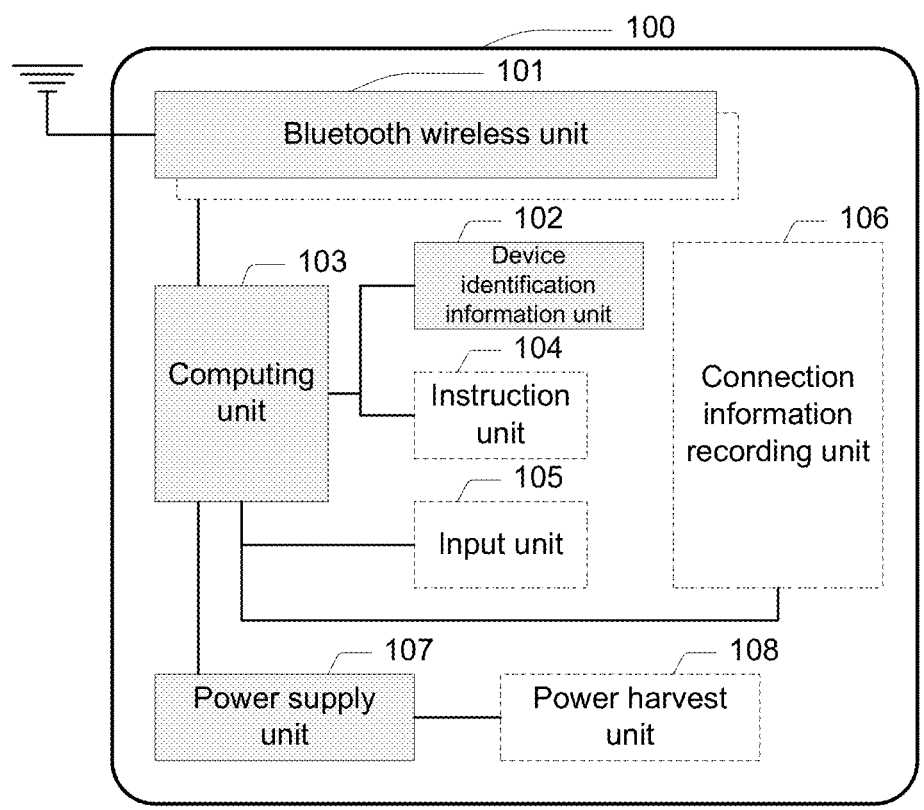
FIG. 1 shows a system schematic diagram of the method of establishing and monitoring Bluetooth low energy wireless network of present invention.

Please refer to FIG. 1; FIG. 1 shows a system schematic diagram of the method of establishing and monitoring Bluetooth low energy wireless network of present invention. As shown in FIG. 1, a plurality of Bluetooth low energy wireless devices 100 can establish a smart Bluetooth low energy wireless network system by the method of the present invention to establish and monitor Bluetooth low energy wireless networks. Wherein, Bluetooth the low energy wireless device 100 can be a wearable device, a network gateway, a handheld device, or a personal computer, but is not limited to the above, and can be an appliance, iBeacon, Eddystone, or AltBeacon, for the intelligent management of devices or items.

In an embodiment of the present invention, the Bluetooth low energy wireless device 100 comprises a Bluetooth wireless unit 101, a device identification information unit 102, an arithmetic unit 103, and an input unit 105.

Each Bluetooth low energy wireless device 100 configures at least one Bluetooth wireless unit 101. The Bluetooth wireless unit 101 has a low energy Bluetooth communication function and can establish a Bluetooth low energy wireless communication link with other Bluetooth low energy wireless devices. In an embodiment of the present invention, a Bluetooth low energy wireless device can be configured with at least one Bluetooth wireless unit, which only accepts a single connection request, but not limited to the above. In another embodiment of the present invention, a Bluetooth low energy wireless device can be configured with a Bluetooth wireless unit, which can accept at least two connection requirements. In an embodiment of the present invention, the Bluetooth wireless unit 101 can be the broadcast state of step S101, the detection state of step S201, the connection establishing state of step S301 or the connection state of step S401 to provide different functions to complete network establishment, disconnection repair or network monitoring.

The device identification information unit 102 may store the device identification code or geospatial information of the Bluetooth low energy wireless device 100. In an embodiment of the present invention, when the Bluetooth low energy wireless device 100 is iBeacon, the device identification information unit 102 can store the device identification code of the iBeacon, wherein the device identification code can comprise a UUID, a MajorID, and a MinorID. In an embodiment of the present invention, the geospatial information can be global positioning system coordinate information or floor location coordinates of a building.

The computing unit 103 can provide a logical operation of establishing a connection with other Bluetooth low energy wireless devices or providing a logical operation for the Bluetooth low energy wireless device to generate a connection record and a device identification code. The computing unit 103 can also provide a logic operation for determining the connect target endpoint of establishing a network connection, and providing a logical operation for selecting the target connection channel of data exchange.

The input unit 105 can be a unit for inputting a control signal via a sound, touching or moving a low-power Bluetooth wireless device, or a unit for inputting a control signal via sound, touch or shake, or even can be a sensing unit having a sensing function, wherein the sensing function comprises a function to sense temperature, humidity, or electrical characteristics.

In an embodiment of the present invention, the present system further comprises an indication unit 104. The indication unit 104 provides visual, audible or tactile indications such as a flashing light source or a warning sound, but is not limited to the above.

In an embodiment of the present invention, the system further comprises a connection information recording unit 106. The connection information recording unit 106 stores a connection record or a connection setting of the Bluetooth wireless device with other Bluetooth wireless devices, or storing the device identification code of other Bluetooth wireless devices that can be connected.

In an embodiment of the present invention, the system further comprises a power supply unit 107 and a power harvest unit 108. The power supply unit 107 provides power required for the Bluetooth low energy wireless device. The power supply unit 107 comprises a disposable battery, a reusable battery, or a general power line input device. The power harvest unit 108 can generate electricity from the power generation medium to provide the generated power to the Bluetooth low power wireless device or to provide and store the generated power in the power supply unit 107. Wherein, the power generation medium can comprise wind, heat, light sensing, radio wave induction, and vibration or motion sensing.

In the method of present invention for establishing and monitoring Bluetooth low energy wireless network, a plurality of Bluetooth low energy wireless devices in a Bluetooth low energy wireless network can exchange data with each other, and transmit data to any other Bluetooth low energy wireless device in the Bluetooth low energy wireless network. In addition, a plurality of Bluetooth low energy wireless devices can be interconnected to form a network in the Bluetooth low energy wireless network system. A plurality of Bluetooth low energy wireless devices also can detect the Bluetooth low energy wireless devices whose connection is interrupted and then repair the Bluetooth connections.

Figure 2:
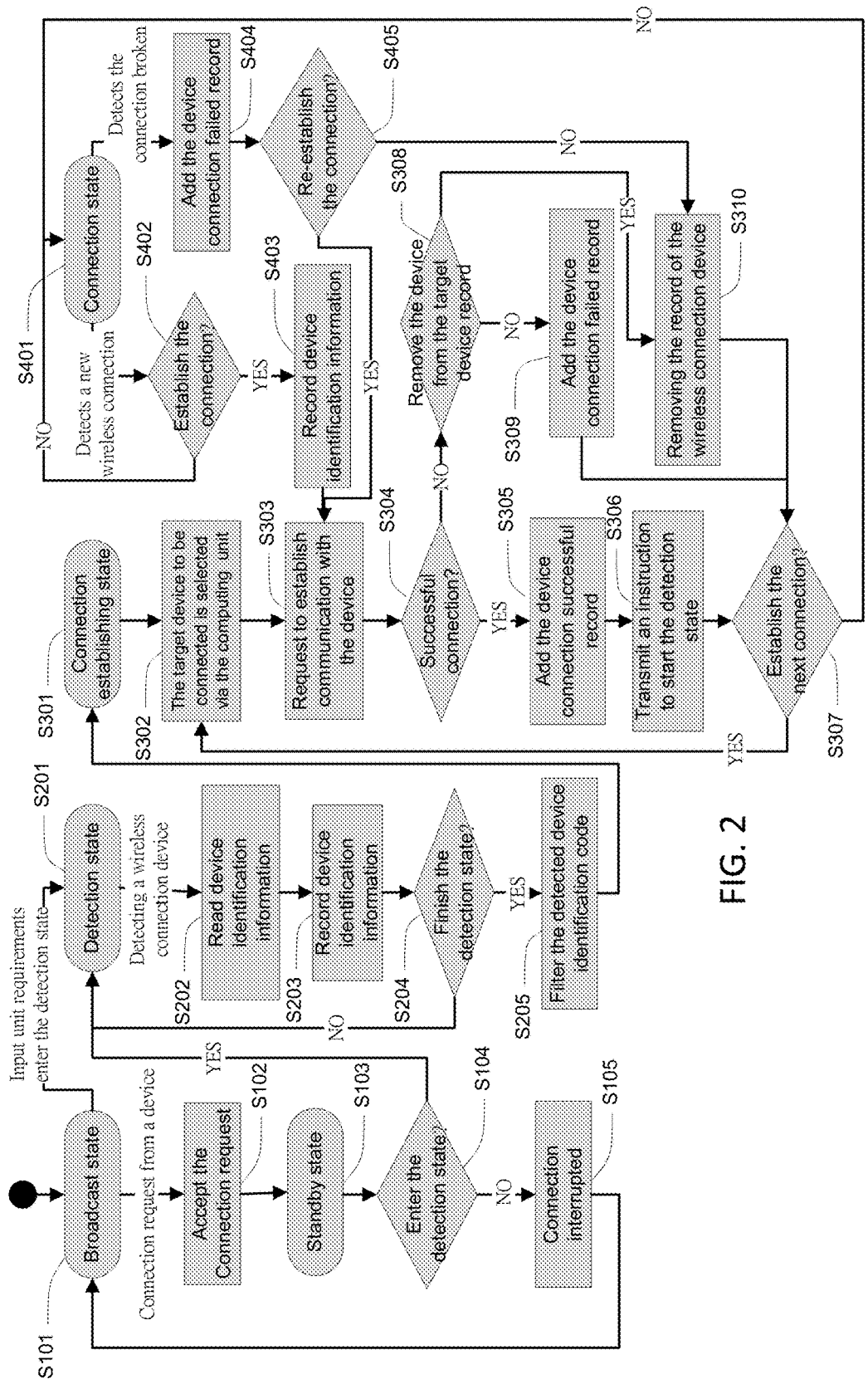
FIG. 2 shows a flow diagram of the method of establishing and monitoring Bluetooth low energy wireless network of present invention.

Please refer to FIG. 2; FIG. 2 shows a flow diagram of the method of establishing and monitoring Bluetooth low energy wireless network of present invention. The present invention provides a method for establishing and monitoring a Bluetooth low energy wireless network using the smart Bluetooth low energy wireless network system as described above to helping a plurality of Bluetooth low energy wireless devices to establish a Bluetooth low energy wireless network.

In an embodiment of the present invention, the method of present invention for establishing and monitoring Bluetooth low energy wireless network, further comprises the following steps of: controlling a first Bluetooth wireless device of the Bluetooth low energy wireless devices to enter a detection state from a broadcast state; wherein, in the detection state, the first Bluetooth wireless device receives a first connectable broadcast signal transmitted from a second Bluetooth wireless devices of the Bluetooth low energy wireless device, and the first connectable broadcast signal comprises a first device identification code corresponding to the second Bluetooth wireless device; wherein, the first Bluetooth wireless device establishes a first Bluetooth connection with the second Bluetooth wireless device according to the first connectable broadcast signal and the first device identification code; and the first Bluetooth wireless device transmits a trigger instruction to the second Bluetooth wireless device via the first Bluetooth connection to control the second Bluetooth wireless device to enter the detection state.

The step of controlling the first Bluetooth wireless device of the Bluetooth low energy wireless devices entering into the detection state from the broadcast state is further described by the embodiment as follows.

In an embodiment of the present invention, in step S101, the Bluetooth wireless device is in the broadcast state, and transmits a connectable broadcast signal, wherein the connectable broadcast signal comprises a device identification code corresponding to the Bluetooth wireless device. In step S102, the Bluetooth wireless device receives a connection request signal from another Bluetooth wireless device. In step S103, enter a standby state. In step S104, a trigger instruction to determine whether to enter the detection state is received. If the determination is no, the connection is interrupted at step S105 and returned to the broadcast state. If the determination is yes, the Bluetooth wireless device enters the detection state in step S201. In another embodiment, the Bluetooth low energy wireless device can also input a trigger instruction via the input unit to cause the Bluetooth wireless device to enter the detection state as described in step S201 and to start the detection procedure.

In the step of the detection state, the first Bluetooth wireless device receives a first connectable broadcast signal transmitted from a second Bluetooth wireless devices of the Bluetooth low energy wireless device, and the first connectable broadcast signal comprises a first device identification code corresponding to the second Bluetooth wireless device; and the step of the first Bluetooth wireless device to establish a first Bluetooth connection with the second Bluetooth wireless device according to the first connectable broadcast signal and the first device identification code is further described by the embodiment as follows.

In step S201, the Bluetooth wireless device is in the detection state to detect other Bluetooth wireless devices. When the Bluetooth wireless device detects other Bluetooth wireless devices, it receives the connectable broadcast signal transmitted by the detected Bluetooth wireless device. In step S202, the Bluetooth wireless device reads the device identification information transmitted from the detected Bluetooth wireless device. In step S203, the Bluetooth wireless device records the device identification code of the detected Bluetooth wireless device in the connection information recording unit 106. In step S204, it is determined whether the detection state is finished. If the determination is no, the Bluetooth wireless device returns to the detection state in step S201. If the determination is yes, the Bluetooth wireless device filters the detected device identification codes recorded in connection information recording unit 106 to filter out of the Bluetooth wireless device that can be connected in step S205. In step S301, the Bluetooth wireless device enters the connection establishing state. Wherein, in an embodiment of the present invention, step S204 determines whether or not to finish the detection state, according to whether it is completed in collecting data of the other Bluetooth wireless devices. If yes, the detection state is finished, but is not limited to the above-described embodiment. In the practical application, step S204 determines whether or not to finish the detection state, may according to whether reaching timeout condition. If yes, the detection state is finished.

In the step of the connection establishing state, the first Bluetooth wireless device establishes a first Bluetooth connection with the second Bluetooth wireless device according to the first connectable broadcast signal and the first device identification code; and the step of the first Bluetooth wireless device transmits a trigger instruction to the second Bluetooth wireless device via the first Bluetooth connection to control the second Bluetooth wireless device to enter the detection state which is further described by the embodiment as follows.

After the Bluetooth wireless device enters the connection establishing state in step S301, the Bluetooth wireless device selects a target Bluetooth wireless device from record of connection recording unit via the computing unit in step S302. In step S303, the Bluetooth wireless device request to establish a communication connection with the target Bluetooth wireless device. In step S304, it determines whether the Bluetooth wireless device and the target Bluetooth wireless device connection are successfully established. If the determination is yes, a record of successful connection to the target Bluetooth wireless device is added in step S305. In step S306, the Bluetooth wireless device transmits a trigger instruction to the target Bluetooth wireless device to command the target Bluetooth wireless device to enter the detection state. In step S307, the Bluetooth wireless device determines whether to establish the next connection. If the determination is yes, the process returns to step S302 and continues to next steps. If the determination is no, the process enters the connection state in step S401. In addition, if the determination of step S304 is no, it is further determined whether to remove the target Bluetooth wireless device that failed to establish the connection from the target device record in step S308. If the determination of step S308 is no, the target Bluetooth wireless device that failed to establish the connection is added to the connection failure record in step S309. If the determination of step S308 is yes, the target Bluetooth wireless device that failed to establish the connection is removed from the target Bluetooth wireless device record in step S310.

Figure 4:
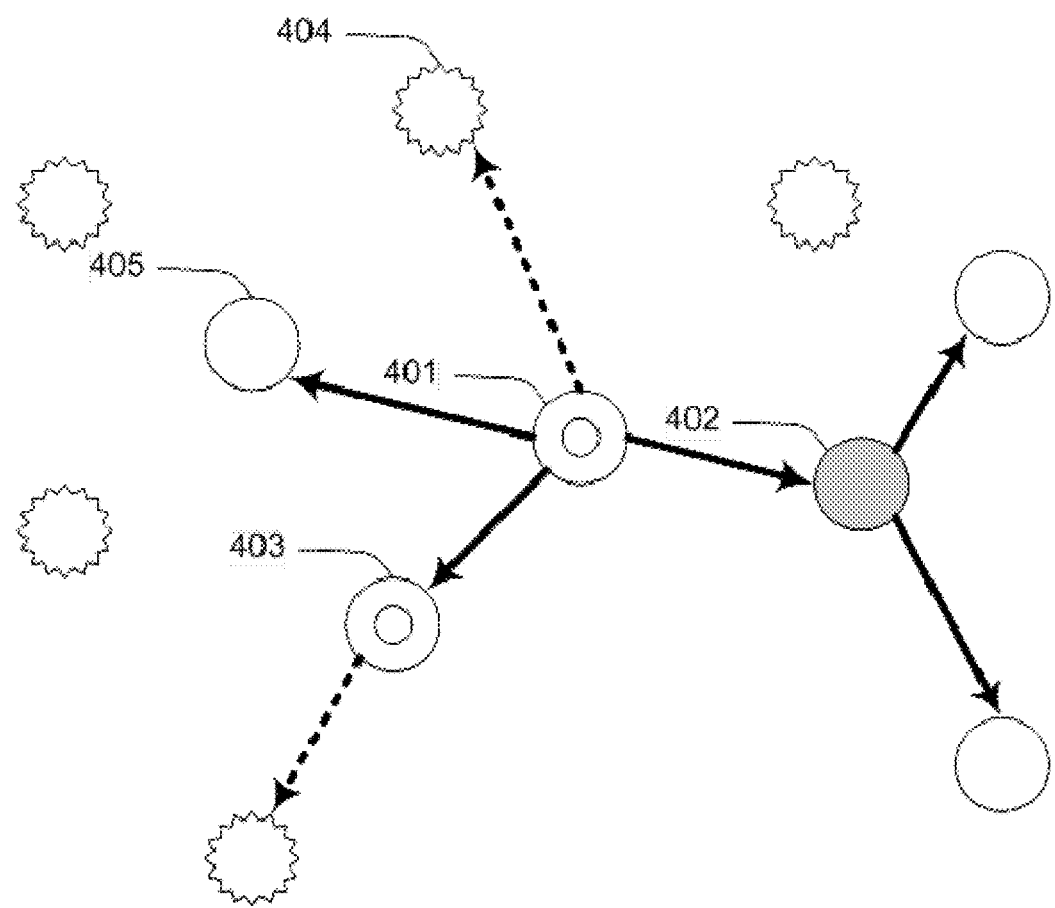
FIG. 4 shows a schematic diagram of forming a Bluetooth wireless network.

Please refer to FIG. 4. FIG. 4 shows a schematic diagram of forming a Bluetooth wireless network. The steps mentioned above are further described by the embodiment as shown in FIG. 4. In an embodiment of the present invention, when the Bluetooth low energy wireless device 401 entered the connection establishing state, wherein it has sequentially established several connections with other wireless connection devices, comprising: a Bluetooth low energy wireless device 405 which has entered the detection state via the trigger instruction from Bluetooth low energy wireless device 401; a Bluetooth low energy wireless device 403 which has entered the connection establishing state after completion of the detection state; a Bluetooth low energy wireless device 402 which has entered the connection state after completion of connection establishing state. In addition, when the Bluetooth low energy wireless device 401 is in the connection establishing state, the Bluetooth low energy wireless device 401 continues to establish a connection with other Bluetooth low energy wireless device which is in the broadcast state (such as the Bluetooth low energy wireless device 404). Thus, the method of present invention for establishing and monitoring Bluetooth low energy wireless network can establish the Bluetooth low energy wireless network by establishing connection and transmitting instruction.

In an embodiment of the present invention, the method of present invention for establishing and monitoring Bluetooth low energy wireless network, wherein after the step of establishing the first Bluetooth connection, the method further comprises the following steps of: wherein, when the first Bluetooth wireless device detects that the first Bluetooth connection is interrupted, the first Bluetooth wireless device generates a corresponding connection failure record; and the first Bluetooth wireless device determines whether to re-establish the first Bluetooth connection with the second Bluetooth wireless device according to the connection failure record. Next, the steps mentioned above are further described by the embodiment as follows.

Please refer to FIG. 2 again. The Bluetooth wireless device enters the connection state in step S401. When the Bluetooth wireless device detects that the connection has been interrupted, the Bluetooth wireless device adds a connection failure record of the target Bluetooth wireless device whose connection is interrupted in step S404. In step S405, it determines whether to re-establish the Bluetooth connection. If the determination is yes, the process returns to step S303 and requests to establish communication with the target Bluetooth wireless device whose connection was interrupted. If the determination is no, the target Bluetooth wireless device that connection has been interrupted is removed from the target Bluetooth wireless device record in step S310.

Figure 5:
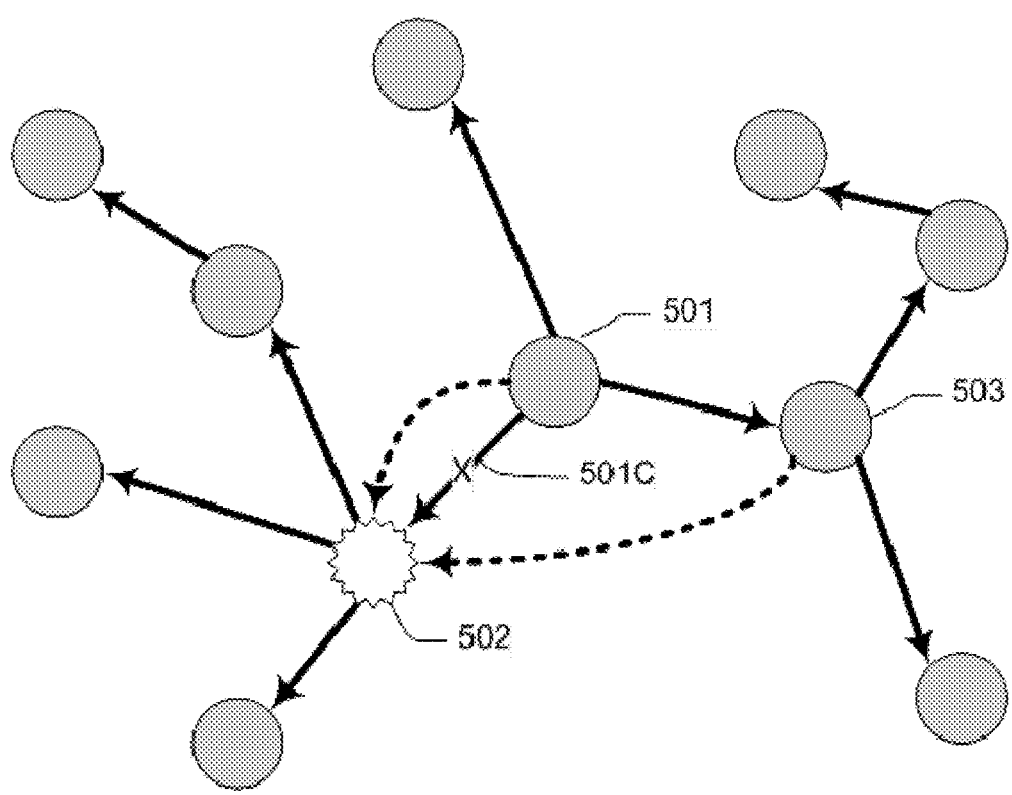
FIG. 5 shows a schematic diagram of recovering from disconnection of the Bluetooth wireless network.

Please refer to FIG. 5. FIG. 5 shows a schematic diagram of recovering from disconnection of the Bluetooth wireless network. The steps mentioned above are further described by the embodiment as shown in FIG. 5. When the Bluetooth low energy wireless device 502 detects that the Bluetooth connection 501C is disconnected from the Bluetooth low energy wireless device 501, the Bluetooth low energy wireless device 502 enters the broadcast state, and the Bluetooth low energy wireless device 502 can accept the connection request from the Bluetooth low energy wireless device 501 or the other Bluetooth low energy wireless devices such as the Bluetooth low energy Bluetooth wireless device 503. As a result, the method of the present invention for establishing and monitoring a Bluetooth low energy wireless network can provide the function of recovering from interrupted connection.

In an embodiment of the present invention, the method of present invention for establishing and monitoring Bluetooth low energy wireless network, further comprising the following steps of: wherein, in the detection state, the first Bluetooth wireless device receives a third connectable broadcast signal transmitted from a fourth Bluetooth low energy wireless device, wherein the third connectable broadcast signal comprises a third device identification code corresponding to the fourth Bluetooth wireless device; and the first Bluetooth wireless device establishes a third Bluetooth connection with the fourth Bluetooth wireless device according to the third connectable broadcast signal and the third device identification code. Please refer to FIG. 2; the steps mentioned above are further described by the embodiment as follows.

As shown in FIG. 2, in an embodiment of the present invention, the Bluetooth wireless device in the detection state in step S201 can receive the wireless signal transmitted by the other Bluetooth wireless device, but is not limited to the above. In another embodiment, the Bluetooth wireless device in the connection state (e.g., the first Bluetooth wireless device connected to the second Bluetooth wireless device) detects the other Bluetooth wireless devices (such as the fourth Bluetooth wireless device) in step S401. As shown in FIG. 2, in the present embodiment, after the Bluetooth wireless device enters the connection state in step S401, the Bluetooth wireless device can further detect whether there is a new Bluetooth wireless device entering the smart Bluetooth low energy wireless network system. When the Bluetooth wireless device detects the new Bluetooth wireless device, it is further determined whether to establish a connection to the new Bluetooth wireless device in step S402. If the determination is yes, the device identification information of the detected Bluetooth wireless device is recorded in step S403. If the determination is no, the process returns to the connection state of step S401.

Figure 6:
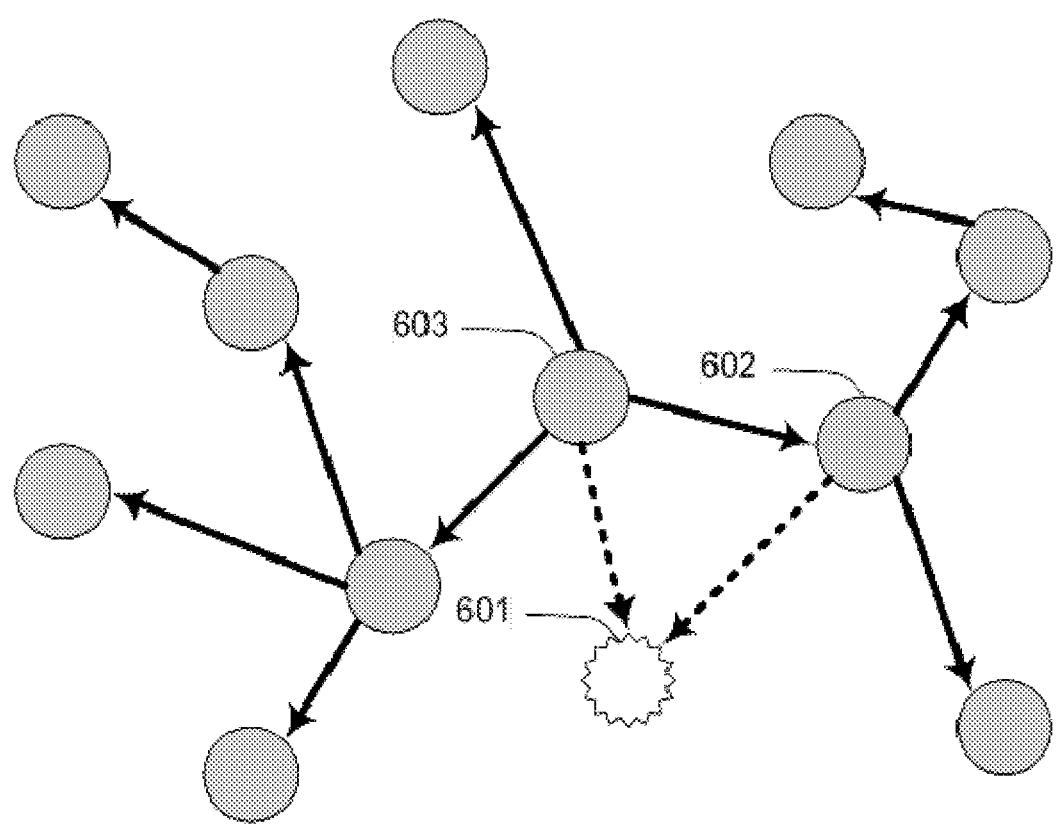
FIG. 6 shows a schematic diagram of extending the Bluetooth low energy wireless network.

Please refer to FIG. 6; FIG. 6 shows a schematic diagram of extending the Bluetooth low energy wireless network. The steps as mentioned above are further described by the embodiment as shown in FIG. 6. When a new Bluetooth low energy wireless device 601 which is in a broadcast state enters into the smart Bluetooth low energy wireless network system, all Bluetooth low energy wireless devices that are in a connection state or in a connection establishing state, such as Bluetooth low energy wireless devices 602 and 603, can attempt to request to establish communication with the Bluetooth low energy wireless device 601 which is within the range of the Bluetooth low energy wireless device 602 and 603. Thus, the method of present invention for establishing and monitoring Bluetooth low energy wireless network can dynamically extend the Bluetooth wireless network.

Figure 3:
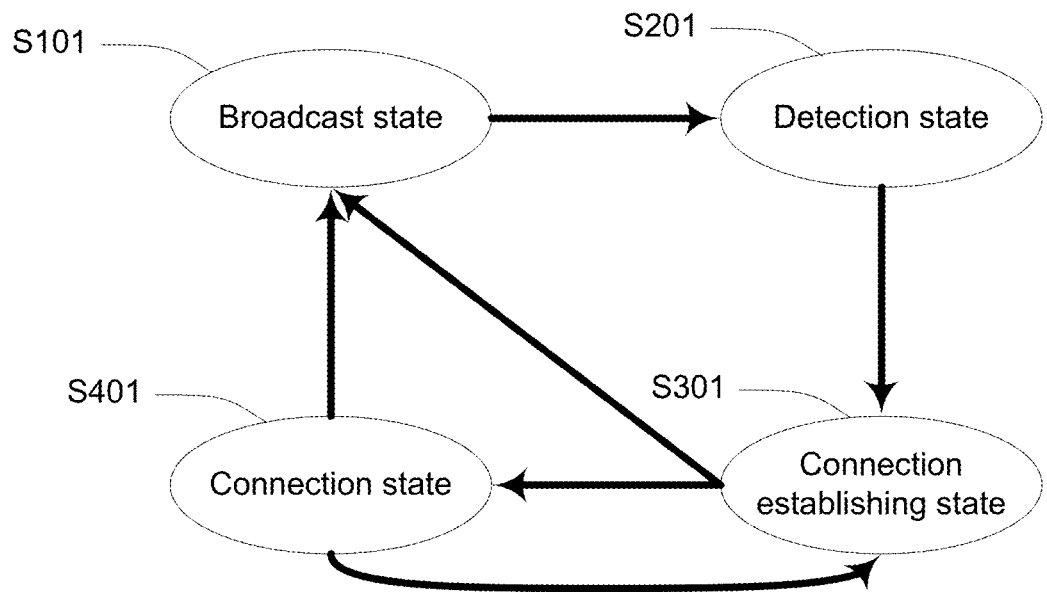
FIG. 3 shows a correlation schematic diagram of the different states of the Bluetooth low energy wireless devices.

Please refer to FIG. 3. FIG. 3 shows a correlation schematic diagram of the different states of the Bluetooth low energy wireless devices. The Bluetooth low energy wireless device has different states and provides different functions in each state to complete the method of present invention for establishing and monitoring the Bluetooth low energy wireless network to achieve network establishment, network disconnection recovering and network monitoring. In the broadcast state of step S101, a Bluetooth low energy wireless device transmits a connectable broadcast signal and receives a connection request signal from the other Bluetooth low energy wireless device when the Bluetooth low energy wireless device does not have any connection established. In the detection state of step S201, the Bluetooth low energy wireless device can receive the connectable broadcast signal from the other Bluetooth low energy wireless device, and to record and filter out the target Bluetooth low energy wireless devices that can be connected. In the connection establishing state of step S301, the Bluetooth wireless device completes sequentially the communication establishment with the target Bluetooth wireless device. In the connection state of step S401, the Bluetooth wireless device can recover network from interruption of connections, and decides whether to add the new wireless connection device to expand the Bluetooth low energy wireless network system by establishing a new Bluetooth connection.

In an embodiment of the present invention, the method of present invention for establishing and monitoring Bluetooth low energy wireless network, further comprising the following steps of: wherein, the first Bluetooth wireless device collects at least one data transmitted by the Bluetooth low energy wireless devices in the Bluetooth low energy wireless network; and the first Bluetooth wireless device monitors at least one data to determine to transmit and distribute at least one data to the corresponding Bluetooth low energy wireless devices.

Figure 7:
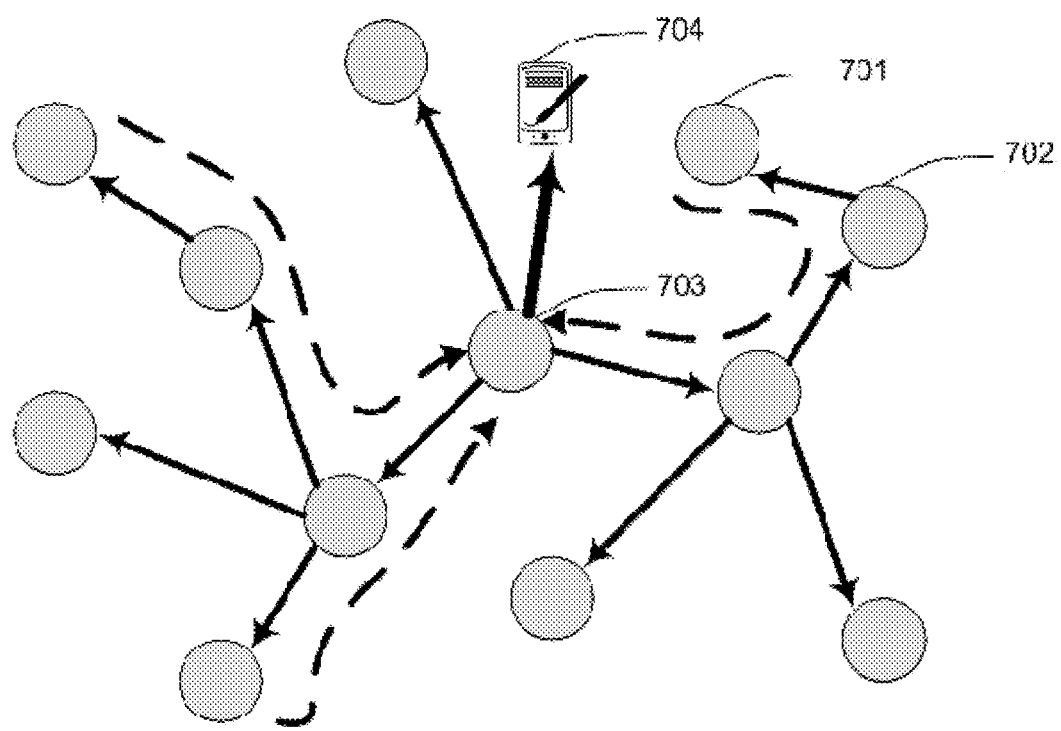
FIG. 7 shows a schematic diagram of data transmission of the Bluetooth low energy wireless network.

Please refer to FIG. 7. FIG. 7 shows a schematic diagram of data transmission of the Bluetooth low energy wireless network. In an embodiment of the present invention, the Bluetooth low energy wireless network system can transmit data or messages to the Bluetooth low energy wireless device 702 of the parent node from the Bluetooth low energy wireless device 701 of each child node. For example, the parent node collects the sensor values or system information of all child nodes, and transmits all of the sensor values or system information to the root node of the Bluetooth low energy wireless device 703. The Bluetooth low energy wireless device 704 establishes a connection with the root node of Bluetooth low energy wireless device 703 to collect all of information in the Bluetooth low energy wireless devices from the Bluetooth low energy wireless network to monitor the system. Wherein, the Bluetooth low energy wireless device 704 can be a wearable device, a network gateway, a handheld device, a personal computer, or the like, but is not limited to the above.

Figure 8:
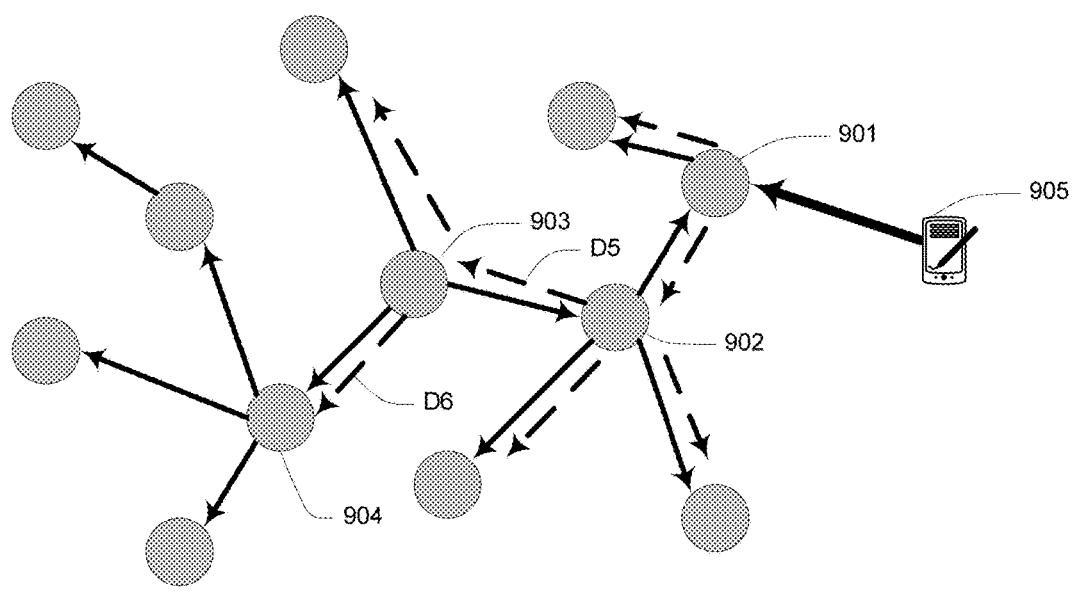
FIG. 8 shows a schematic diagram of data transmission of the Bluetooth low energy wireless network.

Please refer to FIG. 8. FIG. 8 shows a schematic diagram of data transmission of the Bluetooth low energy wireless network. In an embodiment of the present invention, the Bluetooth low energy wireless device 905 can transmit a data to the Bluetooth low energy wireless device 902 via the Bluetooth low energy wireless device 901 in the Bluetooth low energy wireless network. The Bluetooth low energy wireless device 902 transmits the data (such as the data stream D5) to the other Bluetooth low energy wireless device (such as the Bluetooth low energy wireless device 903) and the Bluetooth low energy wireless device 903 transmits the data (such as the data stream D6) to the other Bluetooth low energy wireless device (such as the Bluetooth low energy wireless device 904). Wherein, the Bluetooth low energy wireless device 905 can be a wearable device, a network gateway, a handheld device, a personal computer, or the like, but is not limited to the above.

In the Bluetooth low energy wireless network, each Bluetooth low energy device is interconnected and the settings of any Bluetooth device on the network can be changed by any Bluetooth wireless device via Bluetooth wireless communication. In an embodiment of the present invention, the method of present invention for establishing and monitoring Bluetooth low energy wireless network further comprises the following step of: wherein, the first Bluetooth wireless device modifies the first device identification code of the second Bluetooth wireless device. In an embodiment of the present invention, the Bluetooth low energy wireless device can have iBeacon or Eddystone capabilities, wherein the device identifier code can comprise a UUID, a MajorID, and a MinorID. The Bluetooth low energy wireless device can use the method of present invention to achieve central monitoring, such as changing the UUID, Major ID or Minor ID.

In addition, the Bluetooth low energy wireless device can use the method of present invention to achieve central monitoring. In an embodiment of the present invention, the power information transmitted by all Bluetooth low energy devices can be collected; namely, the Bluetooth low energy wireless network system can collect the remaining power information of all Bluetooth wireless devices via any Bluetooth wireless device.

In an embodiment of the present invention, the method of present invention for establishing and monitoring Bluetooth low energy wireless network, wherein the first connectable broadcast signal comprises a first geospatial information corresponding to the second Bluetooth connection device, and the method further comprises the following step of: the first Bluetooth connection device receives the first connectable broadcast signal transmitted by the second Bluetooth wireless device and generates a relative or absolute geospatial information of the second Bluetooth wireless device according to the first geospatial information, wherein the first geospatial information is global positioning system coordinate information or floor location coordinates of a building.

In an embodiment of the present invention, the first Bluetooth wireless device can detect the Received signal strength indication (RSSI) from the second Bluetooth wireless device, and calculate the relative or absolute geospatial information of the second Bluetooth wireless device in the Bluetooth wireless network system according to the RSSI and the first geospatial information corresponding to the second Bluetooth connection device.

In summary, the method of present invention for establishing and monitoring Bluetooth low energy wireless network, for helping a plurality of Bluetooth low energy wireless devices to establish the Bluetooth low energy wireless network. A plurality of Bluetooth low energy wireless devices in the Bluetooth low energy wireless network can exchange data with each other and can transmit data to any one of the Bluetooth low energy wireless devices in the Bluetooth low energy wireless network. In addition, a plurality of Bluetooth low energy wireless devices can be interconnected to form a network in a low energy Bluetooth wireless network system, and can detect the interruption of connection between the Bluetooth low energy wireless devices and re-establish the connections. A plurality of Bluetooth low energy wireless devices can also dynamically extend the Bluetooth wireless network as well as the collection, transmission and distribution of data.

With the examples and explanations mentioned above, the features and spirits of the invention are hopefully well described. More importantly, the present invention is not limited to the embodiment described herein. Those skilled in the art will readily observe that numerous modifications and alterations of the device can be made while retaining the teachings of the invention. Accordingly, the above disclosure should be construed as limited only by the metes and bounds of the appended claims.

What is claimed is:

1. A method for establishing and monitoring Bluetooth low energy wireless network, for helping a plurality of Bluetooth low energy wireless devices to establish a Bluetooth low energy wireless network, comprising the following steps of:
   controlling a first Bluetooth wireless device of the Bluetooth low energy wireless devices to enter a detection state from a broadcast state;
   wherein, in the detection state, the first Bluetooth wireless device receives a first connectable broadcast signal transmitted from a second Bluetooth wireless devices of the Bluetooth low energy wireless device, and the first connectable broadcast signal comprises a first device identification code corresponding to the second Bluetooth wireless device;
   wherein, in a connection establishing state, the first Bluetooth wireless device establishes a first Bluetooth connection with the second Bluetooth wireless device according to the first connectable broadcast signal and the first device identification code; and
   wherein, the first Bluetooth wireless device transmits a trigger instruction to the second Bluetooth wireless device via the first Bluetooth connection to control the second Bluetooth wireless device to enter the detection state.

2. The method for establishing and monitoring Bluetooth low energy wireless network of claim 1, wherein after the step of establishing the first Bluetooth connection, the method further comprises the following steps of:
   wherein, when the first Bluetooth wireless device detects that the first Bluetooth connection is disconnected, the first Bluetooth wireless device generates a corresponding connection failure record; and
   wherein, the first Bluetooth wireless device determines whether to re-establish the first Bluetooth connection with the second Bluetooth wireless device according to the connection failure record.

3. The method for establishing and monitoring Bluetooth low energy wireless network of claim 1, further comprising the following steps of:
   the second Bluetooth wireless device entering a detection state;
   wherein, in the detection state, the second Bluetooth wireless device receives a second connectable broadcast signal transmitted from a third Bluetooth wireless devices, and the second connectable broadcast signal comprises a second device identification code corresponding to the third Bluetooth wireless device; and
   wherein, the second Bluetooth wireless device establishes a second Bluetooth connection with the third Bluetooth wireless device according to the second connectable broadcast signal and the second device identification code.

4. The method for establishing and monitoring Bluetooth low energy wireless network of claim 1, further comprising the following steps of:
   wherein, in the detection state, the first Bluetooth wireless device receives a third connectable broadcast signal transmitted from a fourth Bluetooth wireless devices of the Bluetooth low energy wireless device, and the third connectable broadcast signal comprising a third device identification code corresponding to the fourth Bluetooth wireless device; and
   wherein, the first Bluetooth wireless device establishes a third Bluetooth connection with the fourth Bluetooth wireless device according to the third connectable broadcast signal and the third device identification code.

5. The method for establishing and monitoring Bluetooth low energy wireless network of claim 1, wherein the first device identification code comprises a UUID, a Major ID, and a Minor ID.

6. The method for establishing and monitoring Bluetooth low energy wireless network of claim 1, wherein the first Bluetooth wireless device modifies the first device identification code of the second Bluetooth wireless device.

7. The method for establishing and monitoring Bluetooth low energy wireless network of claim 1, wherein the second Bluetooth wireless device modifies the second device identification code of the third Bluetooth wireless device.

8. The method for establishing and monitoring Bluetooth low energy wireless network of claim 1, wherein the first connectable broadcast signal comprises a first geospatial information corresponding to the second Bluetooth connection device, the method further comprises the following step of:
   wherein, the first Bluetooth connection device receives the first connectable broadcast signal transmitted by the second Bluetooth wireless device and generates a relative or absolute geospatial information of the second Bluetooth wireless device according to the first geospatial information.

9. The method for establishing and monitoring Bluetooth low energy wireless network of claim 8, wherein the first geospatial information is global positioning system coordinate information or floor location coordinates of a building.

10. The method for establishing and monitoring Bluetooth low energy wireless network of claim 1, further comprising the following steps of:
 wherein, the first Bluetooth wireless device collects at least one data transmitted by the Bluetooth low energy wireless devices within the Bluetooth low energy wireless network; and
 wherein, the first Bluetooth wireless device monitors at least one data to determine to transmit and distribute at least one data to the corresponding Bluetooth low energy wireless devices.

* * * * *